US006845974B2

(12) United States Patent
Bidaud

(10) Patent No.: US 6,845,974 B2
(45) Date of Patent: *Jan. 25, 2005

(54) METHOD OF HOLDING A PART IN POSITION IN AN ASSEMBLY STATION

(75) Inventor: Daniel Bidaud, Taverny (FR)

(73) Assignee: ABB Body in White, Beauchamp (FR)

(*) Notice: Subject to any disclaimer, the term of this patent is extended or adjusted under 35 U.S.C. 154(b) by 0 days.

This patent is subject to a terminal disclaimer.

(21) Appl. No.: 10/414,872

(22) Filed: Apr. 17, 2003

(65) Prior Publication Data

US 2003/0193121 A1 Oct. 16, 2003

Related U.S. Application Data

(62) Division of application No. 09/958,150, filed as application No. PCT/FR00/00782 on Mar. 29, 2000, now Pat. No. 6,575,444.

(30) Foreign Application Priority Data

Apr. 6, 1999 (FR) .............................. 99 04245

(51) Int. Cl.[7] .............................................. B25B 1/00
(52) U.S. Cl. ...................... 269/91; 269/60; 269/289 R
(58) Field of Search ..................... 269/91, 60, 289 R, 269/152, 155, 43, 910, 249, 138–139, 45, 251, 234, 134; 29/281.1

(56) References Cited

U.S. PATENT DOCUMENTS

| 724,116 | A | | 3/1903 | Maley |
|---|---|---|---|---|
| 2,430,613 | A | | 11/1947 | Hodge |
| 3,182,988 | A | | 5/1965 | Woodall |
| 4,175,734 | A | | 11/1979 | Williams |
| 4,611,846 | A | | 9/1986 | Feiber et al. |
| 4,844,678 | A | * | 7/1989 | Schenk .................. 414/223.01 |
| 5,408,737 | A | | 4/1995 | Mailey et al. |
| 5,718,422 | A | | 2/1998 | Morghen |
| 5,816,568 | A | | 10/1998 | Fox |
| 5,893,551 | A | * | 4/1999 | Cousins et al. ............... 269/43 |
| 6,089,440 | A | * | 7/2000 | Brusha ...................... 228/44.3 |
| 6,113,088 | A | | 9/2000 | Gakhar et al. |
| 6,575,444 | B1 | * | 6/2003 | Bidaud ........................ 269/91 |

* cited by examiner

Primary Examiner—Lee D. Wilson
(74) Attorney, Agent, or Firm—Young & Thompson

(57) ABSTRACT

A method of holding a part (5, 16) in position in an assembly station (1), in which the part (5) is put into a determined position in the frame of reference of the assembly station (1) by way of a handling robot (7), at least one clamp (2, 3, 4) is closed onto a portion (5a, 5b) secured to the part, the clamp being mounted to slide freely in a guide (12) of the assembly station (1) extending parallel to its own clamping direction, and the clamp is blocked against sliding when it is clamped onto the part.

8 Claims, 2 Drawing Sheets

METHOD OF HOLDING A PART IN POSITION IN AN ASSEMBLY STATION

In methods of assembling parts together, in particular automotive bodywork parts, it is common practice to bring the various parts for assembly to an assembly station where they are firstly put accurately into position relative to one another, and secondly they are held in position firmly so as to ensure that any forces applied to them by the assembly tooling (welding clamps in particular) do not disturb, alter, or modify their intended positions and thus the general shape of the assembly once it has been made.

BACKGROUND OF THE INVENTION

An assembly station is fed with parts for connecting to one another by a handling tool (a robot) which "entrusts" the part it is transporting to tooling specific to the assembly station, which tool then ensures that the part is put accurately into place and is clamped firmly in place. That conventional disposition suffers from the major drawback of requiring the assembly station to implement tools that are dedicated to each of the parts received. Consequently, to switch from manufacturing one product to another, although it is possible to retain a single handling robot, it is necessary to change the tooling for positioning and clamping the parts relative to the assembly station. That requirement constitutes a major limit on assembly station flexibility, i.e. on its capacity to receive different types of part. It is necessary to have one set of tools for each part and to fit the station with tool-changing means so that such a changeover can be performed as quickly as possible. The assembly station then becomes very cluttered by means for handling these sets of tools (which are often presented in the form of prefitted pallets. It is also necessary for the handling means to be manufactured with care so that the sets of tools are put into place as accurately as possible within the station and do not give rise to unacceptable dispersion in the accuracy with which the parts for assembling together are put into place. Furthermore, such tool changes still require time and that constitutes a factor for lengthening assembly cycle times, which necessarily leads to increased production costs.

Nowadays, the accuracy of handling robots concerning control over the paths they follow and the coordinates of the starting and ending positions of each such path are becoming entirely compatible with the accuracy required for positioning parts in the frame of reference of an assembly station. As a result, it is possible merely by changing the programming of a handling robot to put various different parts accurately into place in an assembly frame of reference within which, likewise by suitable and varying programming, it is possible to give accurate positions to assembly tools such as welding clamps.

It is thus possible to eliminate the specific positioning tools that were previously necessary in assembly stations. Unfortunately, the structure of a robot is unsuitable for withstanding the forces to which parts are subjected by the action of the assembly tools in order to keep each part firmly in position during an assembly operation (e.g. by welding). This leads to a major risk of the resulting assembly having the wrong shape.

OBJECTS AND SUMMARY OF THE INVENTION

The present invention seeks to provide a solution for use in assembling parts (at least two parts) and in particular automotive bodywork parts, which takes advantage of the accuracy of robots to simplify considerably the tooling of assembly stations and thus make them suitable for accepting parts of different shapes, with the consequence of making such stations very flexible in use.

To this end, the invention provides a method of holding a part in position in an assembly station, in which method the part is put into a determined position in the frame of reference of the assembly station by means of a handling robot, at least one clamp is closed onto a portion secured to the part, the clamp being mounted to slide freely in a guide of the assembly station extending parallel to its own clamping direction, and the clamp is blocked against sliding when it is clamped onto the part.

In other words, in the method of the invention, once the part has been put into place by the positioning robot, the part is clamped onto a support which forms part of the assembly station while ensuring that the clamping forces do not constitute parasitic forces concerning the positioning of the part, given that the robot which holds the part in position is not capable of opposing such forces adequately. For example, it will be understood that a clamp which is mounted to slide on the above-mentioned support along a guide parallel to the clamping direction of its jaws cannot exert a force in the sliding direction. Consequently, in theory, clamping does not cause the part to move at all. Once the part has been gripped between the jaws, it suffices to lock a clamp in its guide to ensure that the part is clamped on the support without its position as defined by the robot being altered.

There are several ways in which the clamps can be locked, i.e. in which its degree of freedom along its guide can be eliminated. In a first embodiment, sliding is locked by clamping at least one second sliding clamp having a sliding direction that is not parallel to the sliding direction of the first clamp whose freedom to move along its guide is to be eliminated.

In a second embodiment, sliding is locked by a brake, which acts between the guide and the clamp-carrier slider.

Depending on the shape of the assembly to be made, the number of parts to be put into position relative to one another in the assembly station, the size of these parts, the holds which the handling robot must have on them, and the freedom of access that needs to be left for the assembly tools, the clamps for clamping the part on the support forming a portion of the assembly station act either directly on the part, or else they act on a portion of the robot close to its part-gripping end.

BRIEF DESCRIPTION OF THE DRAWINGS

Other characteristics and advantages of the invention appear from the following description given in non-limiting manner of two embodiments of the invention.

Reference is made to the accompanying drawings, in which.

DETAILED DESCRIPTION OF THE INVENTION

Figure 1:
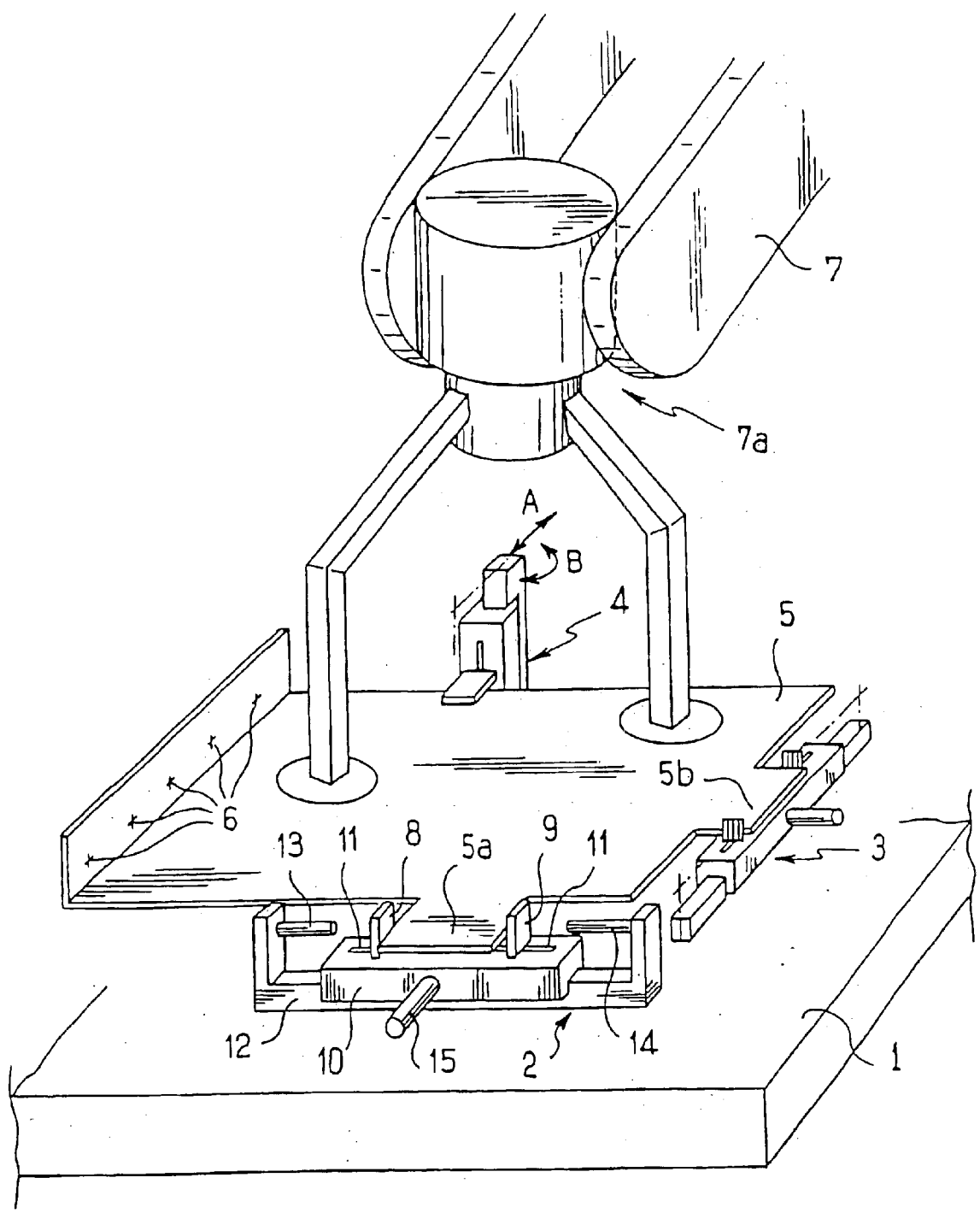
FIG. 1 is a diagram showing how a part can be clamped in an assembly station relative to three orthogonal axes of the frame of reference of the assembly station.

In FIG. 1, a table 1 represents the basic structure of an assembly station. Three clamping means 2, 3, and 4 are placed on the table together with a metal sheet 5 that is to be assembled, e.g. via spot welds 6, to another part placed in the assembly station and not shown. The metal sheet 5 is brought into the frame of reference of the assembly station and is positioned accurately therein by a robot 7 represented diagrammatically merely by a grip 7a to which the part 5 is coupled by known means (clip fastening, suction cup, ... ).

For explanatory purposes, the part 5 is shown as having two side tongues 5a and 5b which are used for clamping the part in a plane parallel to the plane of the support 1 of the assembly station.

Also for reasons of explanation, each of the clamping means is shown as being in the form of a clamp, and comprising for the means 2, for example: two jaws 8 and 9 slidably mounted in a body 10 having slideways 11 and capable of being moved apart from or towards each other, e.g. by means of an actuator which is not shown but which is housed inside the body 10.

The body 10 itself forms a slider mounted to slide freely on a guide 12 which is securely fixed to the table 1 of the assembly station. At its ends, the guide 12 has fixed stops 13 and 14 for the jaws 8 and 9 in order to limit their maximum spacing.

The members 3 and 4 shown diagrammatically in FIG. 1 are of the same structure as the member 2. Nevertheless, it should be observed that the member 3 is orthogonal to the member 2 and that the member 4 is orthogonal both to the member 2 and to the member 3. The slides 10 of each of the members 2, 3, and 4 which are parallel to the clamping and unclamping directions of the is jaws 8 and 9 they comprise, are therefore not parallel to one another.

When the assembly station is waiting for the part 5, the jaws in each pair of jaws are maximally spaced apart from each other, i.e. they are pressed against the stops 13 and 14 in each clamping member. Furthermore, the member 4 which provides vertical clamping for the part 5 is retracted, either by being tilted as represented by arrow A or by being rotated about an axis perpendicular to the support 1 as represented by arrow B. The maximum opening of each clamp defines the maximum size of the portion of a part that it can hold. It will thus be understood that various different parts can be received by said clamping means.

The robot 7 positions the part in the frame of reference of the assembly station while the clamping members are in a waiting position. Once the part is in its final position, a controller (not shown) acting on the displacement actuators of the jaws causes the jaws to move towards each other in pairs. Before this is done, for the member 4 that clamps the part vertically, orders are given to bring it into operation by rotating or tilting as represented by the arrow A or B.

It will be understood that while the clamping members are being tightened, one of the jaws will come to bear against the part 5 so that continued tightening causes the other jaw to come closer while simultaneously causing the support 10 on each member to slide freely. Thus, the amount of force actually applied against the part 5 is minimal, being no more that required to overcome the friction between the slider 10 and the guide 11, and this force can be minimized if high performance guide members are implemented between the slide and the guide, e.g. balls or surfaces having a very low coefficient of friction, and given the small size of this force it can be accommodated by the robot without the robot being deformed and thus without the position of the part 5 being modified.

Once tightening has been completed, i.e. once the jaws are clamped onto the part 5 with a determined amount of force, the part is accurately held in the frame of reference of the assembly station and the clamping forces holding it are sufficient to withstand the forces to which the part 5 will be subjected by the welding tools when performing the spot welds 6 without the part being moved.

It will be understood that any displacement of the slide 10 along its guide 12 is firmly opposed by the clamping performed by the member 3 and the member 4. The same applies to sliding of the slides of said members 3 and 4. This is achieved because the linear degree of freedom of the slide of each clamping member extends in a direction which is not parallel to the direction of either of the others.

In a variant embodiment, e.g. applicable when it is not possible to ensure that the sliding directions of the various clamping means are non-parallel, or applicable as an additional degree of security by eliminating the degree of freedom of each slider, it is possible for the apparatus to include means for locking each slider relative to its guide, as represented diagrammatically for the means 2, as an actuator 15 acting on a shoe for braking or locking the slider 10 relative to the guide 12.

Finally, in other circumstances, it can be advantageous to provide an additional degree of freedom to the clamping devices of the invention, e.g. consisting in the guide 12 itself being secured to the infrastructure (support 1) of the assembly station via an axis of rotation extending orthogonally to the sliding direction of the jaws. In the same manner as described above, this degree of freedom in rotation can be controlled either by the other clamping means becoming clamped, or else or in addition by implementing means for eliminating this degree of freedom in rotation (brakes, locking, ... ).

Figure 2:
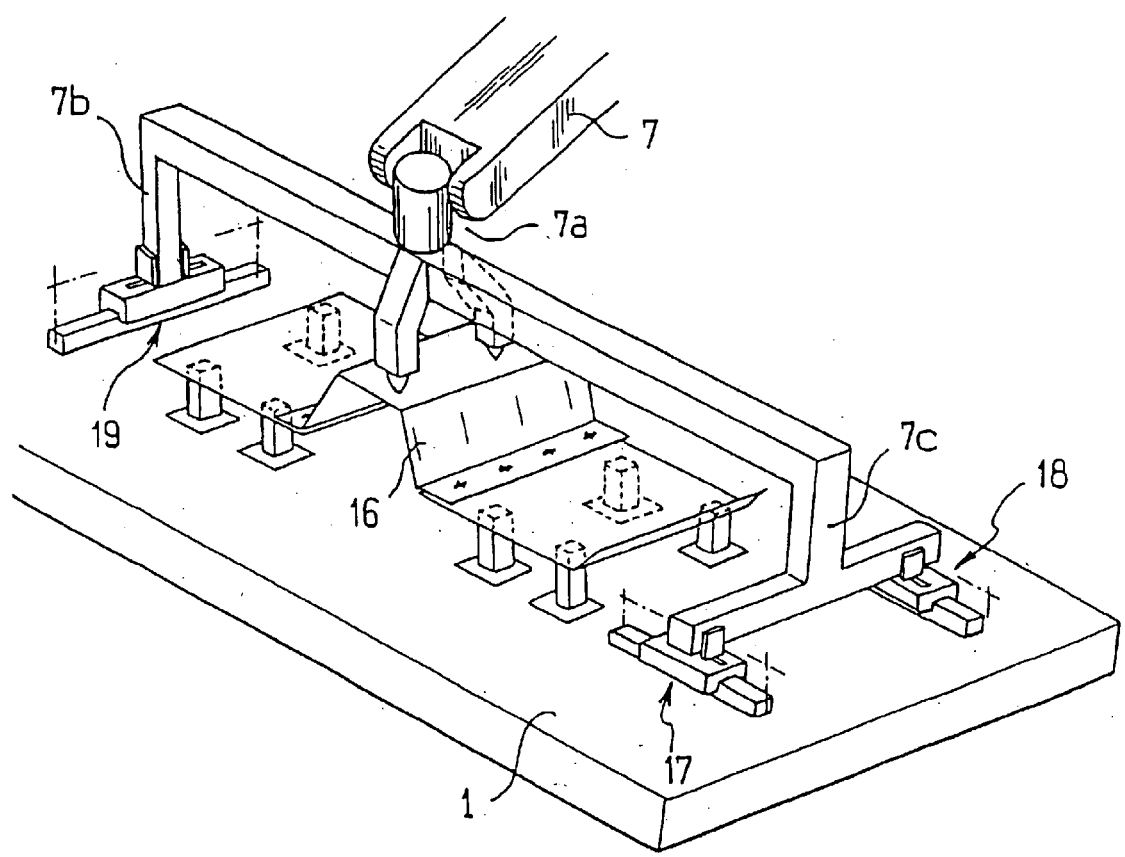
FIG. 2 shows a variant embodiment of a device implementing the method of the invention.

Whereas the part is clamped in position in the assembly station in FIG. 1 by means which act directly on the part, FIG. 2 shows a variant embodiment in which the portion 7a of the robot for gripping the part 16 that has been positioned in the assembly station itself has extensions 7b, 7c which are engaged by the clamping means 17, 18, 19. Clamping operates on the same principle as that described with reference to FIG. 1, and the means 17, 18, and 19 have the same characteristics. This disposition is advantageous insofar as it is desirable, for example, to leave a sufficiently large amount of access within the assembly station in the vicinity of the part for the assembly tools, which can be welding clamps.

What is claimed is:

1. An assembly station comprising:
   a robot for handling a part of a bodywork and to locate the part accurately in a frame of reference in a determined position,
   a table resting in said frame of reference and having means for blocking the part in said determined position over said table,
   said means for blocking including at least one clamp, said clamp comprising a longitudinal guide base fixed on said table, a clamp body slidably mounted on the guide base and forming slideways for opposing jaws movable apart from and toward one another along the slideways and including blocking means fixed to the table for blocking said clamp body with respect to said guide base after said clamp is clamped onto the part.

2. An assembly station according to claim 1, wherein said blocking means include a second clamp which comprises a second longitudinal guide base fixed on said table, a clamp body slidably mounted on the guide base and forming slideways for opposing jaws movable apart from and toward one another along the slideways, said second longitudinal guide base being not parallel to said longitudinal guide base of said least one clamp.

3. An assembly station according to claim 1, wherein said blocking means comprise a brake acting between said clamp body and said guide base.

4. The assembly station of claim 1, further comprising:
a pair of opposing jaws mounted in said slideways, the opposing jaws movable apart from and toward one another along the slideways.

5. An assembly station comprising:
a robot for handling a part of a bodywork and to locate the part accurately in a frame of reference in a determined position,
said robot having a gripping portion for holding the part,
a table resting in said frame of reference and having means for blocking said gripping portion in said determined position over said table,
said means for blocking including at least one clamp, said clamp comprising a longitudinal guide base fixed on said table, a clamp body slidably mounted on the guide base and forming slideways for opposing jaws movable apart from and toward one another along the slideways and including blocking means fixed to the table for blocking said clamp body with respect to said guide base after said clamp is clamped onto said gripping portion of said robot.

6. The assembly station of claim 5, further comprising:
a pair of opposing jaws mounted in said slideways, the opposing jaws movable apart from and toward one another long the slideways.

7. An assembly station, comprising:
a table establishing a reference plane; and
a first clamp and a second clamp positioned over the table,
each of the clamps comprising a guide base a body slidably mounted on the guide base, slideways located within the body, and two opposing jaws slidably mounted in the body by way of the slideways and movable apart from or toward one another along the slideways,
at least the first clamp having a main longitudinal axis parallel to the reference plane, and
the second clamp having a main longitudinal axis perpendicular to the main longitudinal axis of the first clamp.

8. The station of claim 7, further comprising a robot attachable to a work piece and configured for moving the work piece into the clamps.

* * * * *